Figure 1:
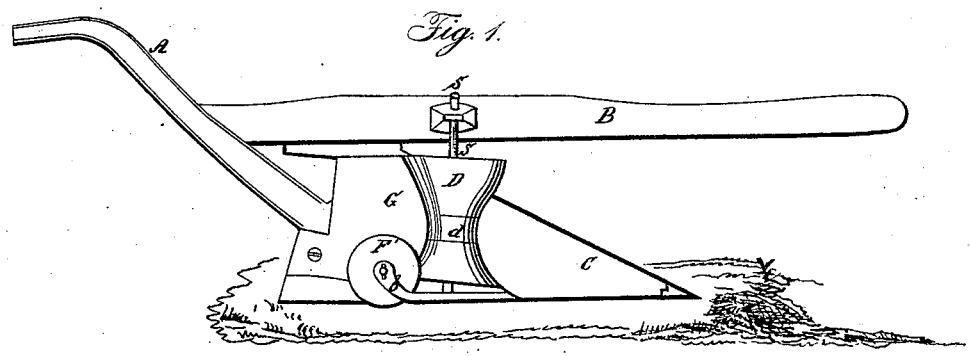
Figure 2:
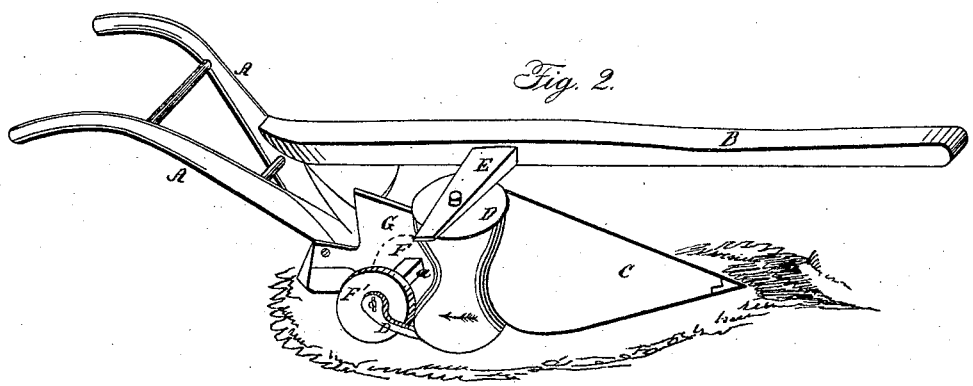
Figure 3:
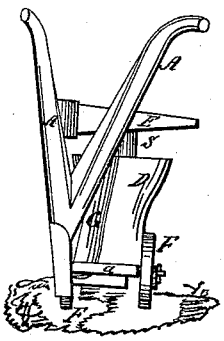

F. F. CARY.
Revolving Moldboard.

No. 42,631. Patented May 3, 1864.

Witnesses:

Inventor:

UNITED STATES PATENT OFFICE.

FERDINAND F. CARY, OF NEW YORK, N. Y.

IMPROVED PLOW.

Specification forming part of Letters Patent No. 42,631, dated May 3, 1864.

*To all whom it may concern:*

Be it known that I, FERDINAND F. CARY, of the city and county of New York and State of New York, have invented certain new and useful Improvements in Plows; and I do hereby declare that the following is a full and exact description thereof, reference being had to the annexed drawings, forming a part of this specification, and on which like letters refer to the same parts.

The object of my improvements is to lessen the resistance, improve the action, and facilitate the motion of this important agricultural implement when in actual use.

To enable others skilled in the art to understand, construct, and use a plow with my improvements, I will here give a full, clear, and exact description of them with the aid of the drawings thereof, in which—

Figure I is an elevatoin, Fig. II is a perspective view, and Fig. III is an end view, of a plow with my several improvements thereof.

In these drawings, A represents the handle; B, the beam; C, the toe; D, a roller; E, a brace extending from the beam; F, wheel; G, a scraper, and S a spindle passing through the roller D.

I claim no particular improvement in the handles or beam. Therefore any of the ordinary and well-known forms may be used. Instead, however, of an entire mold-board, I retain only so much of the anterior portion (see C, Figs. I and II) as may be necessary to break up the ground or sod to the required depth. The general form of this part is that of an oblique-angled triangle, the longest side of which extends from the beam to the toe, and, being made sharp on its edge, performs the function of a colter. The lower edge of this part—or, as I call it, "toe," to distinguish it from the ordinary and full share—is also made sharp, and it is best to give a slight bevel or projection to both these edges. Of course, like the ordinary plowshare, this toe gradually widens from the point backward to the lower part of the roller, giving to the whole exposed surface an inclination forward and outward. The back line or edge is curved in a form to fit the curve of the roller as close as possible without coming in actual contact with it.

The roller D, which is the most important part of my improvement, has a form not easily described, but can be readily understood by reference to the figures. It very nearly resembles two truncated cones brought together at their apices, and indeed I sometimes make it in two parts, as seen at $d'$, Fig. I. The lower edge of the roller is sharpened, and, projecting beyond the lower line of the point, cuts the roots of the sod or earth, so that the furrow, slice can rise freely up the side of the roller. It is evident that the furrow-slice, after being thus lifted up by the lower portion of the roller and coming in contact with the upper, must be turned outward by its gradually-expanding end, and be finally turned over, as is done by the ordinary mold-board; but by my improvement the immense friction that necessarily takes place in this operation with ordinary plows is almost entirely destroyed, as but little friction can occur, since the roller, revolving under the pressure of the furrow-slice as the plow advances, throws the strain entirely upon the spindle $s$.

The scraper G is firmly attached to the posterior portion of the plow, behind the roller, and has its anterior face or edge curved to suit the curvature of the roller, and is made to fit as close up to it as possible without coming directly in contact therewith. The object of this scraper is to clean the face of the roller of any dirt or earth that might adhere to it from the furrow-slice.

The landside of my plowshare is plain and smooth, like those in common use; but within it I arrange a wheel or disk, as shown in dotted lines at F in Fig. II, whose periphery, projecting slightly below the general level of the bottom of the plow, and consequently lifting the back end of the plow from the ground, serves to lessen the friction produced by its contact with the bottom of the furrow. As this wheel or disk is entirely covered on the outside by the landside of the plowshare, it will be but little liable to become choked or stopped in its revolutions by earth or weeds. Sometimes I use also another wheel, as seen at $F'$ in full lines in Figs. I, II, and III, and, if deemed advisable, these two wheels or disks may be united by an axle, as shown at $a\,a$, Figs. II and III. I have shown the axle fastened to the back and lower edge of the toe by a curved bar, *b*, Figs. I and II. It may, however, be framed or secured to the back part or heel of the plow, if such an arrangement should be preferred.

From this description the mode of action or operation of my improved plow can be readily appreciated by any person familiar with this instrument of agriculture. The point of the toe C, advancing, lifts the furrow slice as it is cut from the land by the vertical sharp edge and separated from the parts below by the horizontal edge, and delivers it upon the face of the roller. This, necessarily moving upon or with its spindle S, revolves in the direction of the arrows, and by its expanding top turns the slice over to the desired position, and so leaves it.

I prefer to make the lower edge of the roller project beyond the outer edge of the toe, as by or in consequence of its rotary motion it will cut the earth better or easier than the fixed edge of the toe will. By cutting the roller across and leaving one of the parts only attached to the spindle, or both detached and free to revolve independent of each other, the diameters of the two parts, except when in contact, may be made to differ to any reasonable extent. By this arrangement the same plow, by a simple change in the parts of the roller, may be made to cut a furrow of any required width usual in farming operations.

Having thus fully described the nature of my invention, what I claim therein is—

1. The roller D, when the diameter at the lower end is equal to or greater than the upper end, as shown and described, and composed of one piece, or divided transversely near the middle or smallest diameter, said roller working upon a vertical, or nearly vertical, spindle, S, substantially as and for the purpose described.

2. The roller D, as described, in combination with the toe C, scraper G, and one or both of the wheels or disks, F and F', arranged and operating substantially as set forth.

FERDINAND F. CARY.

Witnesses:
MOVIUS I. MEYER,
H. KING.